United States Patent [19]

Huenlich

[11] Patent Number: 5,477,538
[45] Date of Patent: Dec. 19, 1995

[54] METHOD FOR ALLOCATING SWITCHING-ORIENTED RESOURCES IN A COMMUNICATION SYSTEM OPERATING IN THE ASYNCHRONOUS TRANSFER MODE

[75] Inventor: Klaus Huenlich, Neuching, Germany

[73] Assignee: Siemens Aktiengesellschaft, Munich, Germany

[21] Appl. No.: 328,339

[22] Filed: Oct. 21, 1994

Related U.S. Application Data

[63] Continuation of Ser. No. 128,197, Sep. 29, 1993, abandoned.

[30] Foreign Application Priority Data

Sep. 29, 1992 [DE] Germany .................. 42 32 652.4

[51] Int. Cl.[6] .................................................. H04J 3/14
[52] U.S. Cl. .................................... 370/60.1; 370/60
[58] Field of Search .................... 370/60, 94.1, 60.1, 370/13, 17, 856, 92, 93, 58.2, 58.1, 58.3, 61, 68.1, 95.1, 110.1; 340/825.5, 825.51

[56] References Cited

U.S. PATENT DOCUMENTS

| | | | |
|---|---|---|---|
| 5,070,498 | 12/1991 | Kakuma et al. ................... | 370/60 |
| 5,153,877 | 10/1992 | Esaki et al. ...................... | 370/60 |
| 5,179,556 | 1/1993 | Turner ............................. | 370/94.1 |
| 5,224,092 | 6/1993 | Brandt ............................. | 370/94.1 |
| 5,231,631 | 7/1993 | Buhrke et al. ................... | 370/94.1 |
| 5,255,266 | 10/1993 | Watanabe et al. ............... | 370/60.1 |
| 5,267,232 | 11/1993 | Katsube et al. ................. | 370/94.1 |

OTHER PUBLICATIONS

IEEE International Conference on Communications, Conference Record vol. 1, World Prosperity through Communications (1989), "A Statistical Bandwidth Allocation and Usage Monitoring Algorithm for ATM Networks", P. Joos et al, 13.5.1 through 13.5.8.

*Primary Examiner*—Douglas W. Olms
*Assistant Examiner*—Huy D. Vu
*Attorney, Agent, or Firm*—Hill, Steadman & Simpson

[57] ABSTRACT

The allocation of the switching-oriented resources of a communication system (KS) operating in the asynchronous transfer mode is controlled for connections wherein cells (Z) communicated by a communication terminal equipment (KE) connected to the communication system (KS) are to be switched without cell losses. Logon information and scope of resources information (ai, ri) communicated within the framework of the call signaling are thereby entered in call-associated fashion into an immanent routing table (LT) of the communication system. Given reception of a first cell (Z) to be communicated free of losses, this and the further cells (Z) are switched with the assistance of the logged on switching-oriented resources (VR) in so far as no resources availability information (rvi) dependent on the traffic load of the communication system (KS) is entered into the routing table (LT). Given a successful switching, resources use information (rvi) is inserted into the routing table (LT), as a result whereof the switching-oriented resources (VR) are exclusively allocated to the call for the switching of the cells (Z) to be communicated free of cell losses.

15 Claims, 3 Drawing Sheets

FIG. 4A

START OF THE ALLOCATION ROUTINE ZR AFTER THE RECEPTION OF A CELL ZS PROVIDED FOR THE SIGNALLING AND COMMUNICATED FROM A COMMUNICATION TERMINAL EQUIPMENT KE(x) WHEREIN SIGNALLING INFORMATION si IS INSERTED INTO A LOG ON INFORMATION ai

↓

READ SCOPE OF RESOURCES INFORMATION ri RECITED IN THE SIGNALLING INFORMATION si AND INSERT INTO THE ADMINISTRATION MEMORY AREA OF THE ALLOCATED, CALL-ASSOCIATED MEMORY AREA SB(x) OF THE ROUTING TABLE LT

WAS CELL z OF a FURTHER CONNECTION RECEIVED?

NO → FIRST CELL (Z) COMMUNICATED FROM THE COMMUNICATION TERMINAL EQUIPMENT KE(x) RECEIVED

YES → ALLOCATE LOGGED ON SWITCHING-ORIENTED RESOURCES VR TO FURTHER CONNECTION

IS rvi INSERTED INTO THE ROUTING TABLE?

YES (A) TO FIG. 4B

NO (B) TO FIG. 4B

METHOD FOR ALLOCATING SWITCHING-ORIENTED RESOURCES IN A COMMUNICATION SYSTEM OPERATING IN THE ASYNCHRONOUS TRANSFER MODE

This is a continuation of application Ser. No. 08/128,197, filed Sep. 29, 1993 now abandoned.

BACKGROUND OF THE INVENTION

Digital information to be communicated in communication systems operating in the asynchronous transfer mode, particularly in switching equipment or switching-oriented front-end equipment is communicated by packets having a fixed length, which are known as cells in the technical field. The cells cover 48 octets for the digital useful information to be communicated and 5 octets for a cell header in which is inserted the switching-oriented information for a virtual path in a communication network. The cells are predominantly formed in communication terminal equipment connected to the communication system and are communicated to the communication system. Alternatively, digital information communicated by the communication terminal equipment can be packeted into cells in the communication system.

Previously known methods for allocating switching-oriented resources of a communications system are based on statistical traffic behavior of the communication terminal equipment, whereby the switching-oriented resources are allocated to the cells or digital information incoming in the communication system in the sequence of their arrival for the purpose of an internal switching in the communication system. The switching-oriented resources represent those operating means that are provided for the temporary switching of the cells given, for example, dialed connections. The switching-oriented resources particularly encompass the central switching equipment and sub-switching equipment as well as multiplexing equipment of communication systems.

A communication relationship or connection between the communication terminal equipment via virtual routes or paths in a communication network operating in the asynchronous transfer mode is established with the assistance of known, standardized signaling procedures. A routing table is thereby provided for each of the communication systems lying in the virtual path. Path information defining the communication system input and output of the path that are calculated by the communication systems during the signaling procedure is inserted into these routing tables. The switching-oriented resources required for the respective connection are allocated in the communication systems on the basis of switching-oriented particulars such as average transmission rate or peak transmission rate that are signaled by the communication terminal equipment.

Given a temporary overload situation of a communication system, i.e., the scope of the switching-oriented resources of a communication system is not adequate in order to switch the incoming cells, those cells that cannot be immediately switched are intermediately stored in memory devices in a known way. However, a switching of the cells that is free of cell losses or free of disturbances is achieved with a somewhat greater delay. Given longer-duration overload situations, individual cells or cell groups are switched or discarded, for example according to a statistical method, i.e., are no longer transmitted. Such a statistical allocation of switching-oriented resources is known, for example, from the publication, IEEE International Conference on Communications, Conference Record Vol. 1, World Prosperity through Communications (1989), 'A statistical band with allocation and usage monitoring algorithms for ATM-networks', 13.5.1 through 13.5.8. Furthermore, it is known to implement the discarding of the cells dependent on an identifier for example, on a priority identifier. The cells having lower priorities are thereby discarded substantially more often than cells having higher priorities. In all of these known methods, at least individual cells are discarded, as a result whereof frequently disturbed transmissions are recognized and renewed transmission attempts are initiated in the transmission of data, for example file transfers, being initiated by the higher-ranking protocol levels in the communication terminal equipment. These disturbances in data transmission caused by the cell discarding ultimately lead to more and more repetitions of transmissions and to a further increase in the traffic load on the communication system involved therewith and, connected therewith, to constantly dropping usage rates of the transmission capacities. This means that a communication of digital information, particularly when there must be no data loss, is no longer possible in overload situations of communication systems operating in the asynchronous transfer mode due to constant repetitions and the resulting increased traffic load.

SUMMARY OF THE INVENTION

It is an object of the present invention to provide for communicating digital information, particularly data, largely without information loss or data loss via communication systems operating in the asynchronous transfer mode taking different traffic load situations into consideration.

In general terms the present invention is a method for the allocation of switching-oriented resources in a communication system operating in the asynchronous transfer mode and having communication terminal equipment connected thereto. Switching-oriented scope of resources provided for the communication of the digital information is reported by the communication terminal equipment whose digital information packeted in cells is to be communicated via the communication system without cell losses. It is reported within the framework of a call signaling by a logon information as well as by a scope of resources information. Two resource administration areas are provided in routing tables of the communication system with whose assistance switching-oriented path information, the logon information and the scope of resources information are respectively entered in call-associated fashion. Resources availability information and/or resources use information is capable of being entered into the two resource administration areas with the assistance of the communication system. The resources availability information indicates the availability of the logged on scope of resources in the communication system dependent on the traffic load. Given reception of a first cell to be communicated free of cell losses in the communication system, the first and further cells are discarded, dependent on the insertion of resources availability information or cells are switched loss-free with the assistance of the logged on switching-oriented scope of resources. Given a switching of the cells, resources use information is entered into the allocated resources administration area. As a consequence the logged on scope of resources is exclusively allocated to the respective call for the communication of the cells to be communicated free of cell losses.

An important aspect of the method of the present invention is that a resource allocation procedure for cells to be communicated free of cell losses is initiated with the assistance of logon information communicated by the communication terminal equipment during the signaling procedure as well as with the assistance of a scope of resources information. The scope of resources required for communication free of cell losses is thereby reported by inserting the scope of resources information into the routing table of the respective communication system, but is not yet allocated. After the reception of the first cell to be communicated free of cell losses, the switching-oriented resources are allocated for the duration of the connection exclusively for the communication of the cells to be communicated free of cell losses. That is, they are not available for other connections in so far as resource availability information formed by the communication system and dependent on the traffic load of the communication system is not inserted into the routing table. When resource availability information is inserted, i.e., given an inadequate availability of the switching-orientated resources in a communication system, for example in a traffic overload situation, all incoming cells to be communicated free of cell losses are discarded, i.e., are not switched. What is achieved on the basis of this measure is that repeated data transmission repetitions are avoided in data transmissions, whereby the respective connection is interrupted substantially earlier by the higher-ranking protocol levels in the respective communication terminal equipment, i.e., the communication of cells is stopped. After an allocation of the switching-oriented resources as a result of the reception of the first cell to be communicated free of cell losses, resource use information is inserted into the known routing table of the respective communication system, whereby the switching-oriented resources can be allocated up to the allocation for other cells to be switched. The switching-oriented resources exclusively allocated for communication of cells that are free of cell losses are released for further switching of cells after the reception of the last cell, being released by removing the resource use information from the routing table. The advantages of the method of the present invention is that any and all cell loss for digital information to be communicated free of cell losses is avoided. No further, additional traffic load arises and, thus, does not lead to any further increase in the overload situation given an overload situation of the communication system as a result of the complete discarding of cells to be communicated free of cell losses for which no switching-oriented resources are available.

According to a further development of the method of the present invention, the scope of resources information is especially advantageously represented by bit rate information, for example in KBit/s that indicates the transmission rate.

According to another advantageous development of the method of the present invention, the resource administration areas are realized by an area respectively representing one bit and the logon information. Resource availability and resource use information is represented by binary information covering one bit. As a result of this measure, the information additionally provided for the method of the present invention is incorporated into the existing switching-oriented information with minimum additional outlay.

A method of the present invention is especially advantageously realized by an allocation routine ZR implemented in each communication system, whereby the method can be superimposed on a statistical allocation method. Potentially superimposed priority controls or intermediate memory methods are incorporated in statistical allocation methods.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
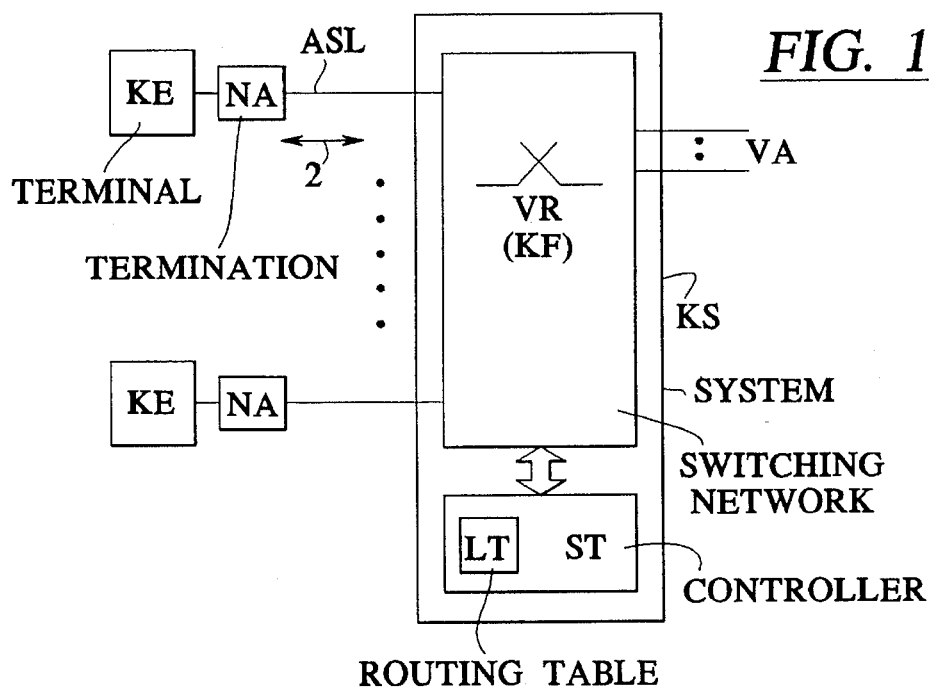
FIG. 1 is a block circuit diagram of a communication system operating in the asynchronous transfer mode.

FIG. 1 shows a communication system KS to which communication terminal equipment KE are connected via subscriber lines ASL and network termination means NA and to which trunks leading to further communication systems KS are connected. The communication system KS has a switching network KF operating in the asynchronous transfer mode. In the exemplary embodiment, this switching network KF represents the sum total of the switching-oriented resources VR of the communication system. Other switching-oriented resources VR are represented, for example, by sub-switching network devices of front-end network equipment, for example multiplex devices working in the asynchronous transfer mode. The switching-oriented settings of the switching network KF or of the switching-oriented resources VR are effected with the assistance of a program-controlled controller ST allocated to the switching-oriented resources VR.

The digital information ni to be communicated is inserted into cells Z in the communication terminal equipment KE and are forwarded to the communication system KS. Alternatively, digital information ni communicated by the communication terminal equipment KE can be packeted into cells in the network termination means NA. Further, the physical matching to the transmission-oriented conditions of the subscriber line ASL are implemented in the network termination means NA. Signalization-associated cells are provided for the set-up of a connection between at least two communication terminal equipment, whereby the cell header contains the virtual channel and path information and the signalling information is inserted into the information part.

Figure 2A:
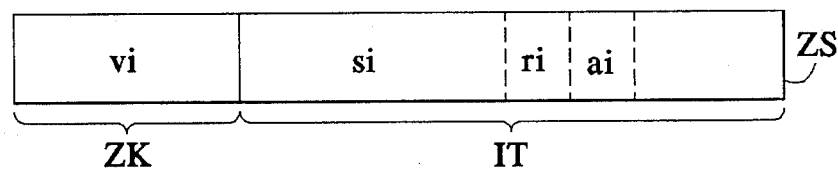
FIGS. 2A and 2B depict the structure of a cell to be switched and that is provided for the call signaling.
Figure 2B:
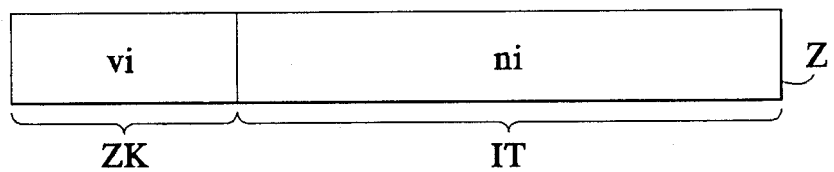

FIGS. 2A and 2B each respectively show the structure of a cell Z, ZS that is provided for the call signaling and that is to be switched. A cell Z, ZS standardized according to the CCITT Recommendations is formed by an information part IT covering 48 octets and by a cell header ZK covering 5 octets. The digital information or useful information ni to be communicated or signaling information si is inserted into the information part IT. Let it be assumed for the exemplary embodiment that the cell header ZK is essentially structured in conformity with the CCITT Recommendations for the communication terminal equipment/communication system interface. The switching information vi contained in the cell header ZK is thereby represented by virtual path information and by virtual channel information. Given a cell ZS provided for the signaling, a virtual path, i.e., a virtual connection from one communication terminal equipment KE is set up via one or more communication systems to a further communication terminal equipment KE identified by the signaling information. The virtual path is set up with the assistance of this switching information vi and the signaling information si inserted into the information part IT. The setting information for the respective path or the respective connection is identified in every communication system KS and is stored in a routing table LT for the duration of a call.

Figure 3:
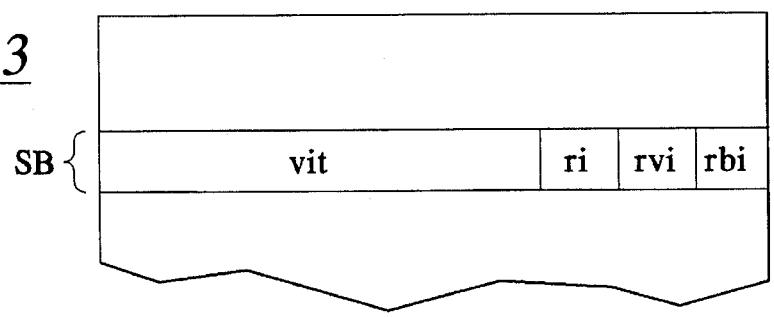
FIG. 3 is an excerpt from a routing table arranged according to FIG. 1.

FIG. 3 shows the structure of such a routing table LT. A defined memory area SB is thereby provided for every call or for every path. A switching-oriented information bit essentially calculated with the assistance of the controller ST is entered into the memory area SB. The cells Z belonging to the respective call are switched from an entry point to an exit point of the switching network KF or of the switching-oriented resources VR using these switching-oriented information bits. The entry point or the exit point can represent an input or output, respectively, of the switching network KF connected either to the subscriber line ASL or to a trunk line VL.

In the method of the present invention, the cells ZS provided for the signaling are formed in a known way in the communication terminal equipment KE or network termination means NA. However, for those cells Z whose digital information ni are to be switched via the communication system KS free of cell losses logon information ai and scope of resources information ri are communicated to the allocated communication system KS together with the signaling information si. What is indicated, first, for the communication system KS by this communication is that the following cells Z to be switched are to be switched free of cell losses and, second, the scope of the switching-oriented resources vr required for the communication of the digital information is reported. After the reception of a cell ZS formed in this way in a communication system KS, a connection is set up in a known way to the destination communication terminal equipment KE, whereby the corresponding, switching-oriented information vi is entered into the routing table LT. The scope of resources information ri is inserted in addition to this known, switching-oriented information vi. Further, a resources availability information rvi formed by the respective communication system KS can be entered into the routing table LT. This resources availability information rvi is formed dependent on the traffic load of the communication system KS. Let it be assumed for the exemplary embodiment that the resources availability information rvi is entered into the routing table LT when the communication system KS is in an overload situation.

When the routing table LT has no resources availability information rvi for the respective connection, then the required switching-oriented resources VR are allocated after the reception of the first cell Z to be switched free of cell losses in the respective connection, assuming that the switching-oriented resources VR are still available. At the same time, resources use information rvi is formed in the respective communication system KS and is entered into the respective memory area SB of the routing table LT. What is thereby achieved is that switching-oriented resource sets VR allocated for the switching of the cells Z to be communicated free of cell losses are exclusively reserved for the duration of this call, i.e., they are no longer available for the communication of further cells Z. At the reception of the last cell Z to be switched free of cell losses, the entered resources use information rvi is removed by the communication system, as a result whereof the switching-oriented resources VR are available for switching other, arbitrary cells Z.

Given entered resources availability information rvi, the first cell Z to be communicated free of cell losses, as well as all further, following cells Z are discarded, i.e., are not forwarded, at the reception of this first cell Z to be switched free of cell losses. What is achieved by the complete discarding of the cells Z is that no digital information ni disturbed by cell losses can be communicated via the respective communication system KS or via further communication systems KS. The complete discarding of the cells Z thereby leads to a considerable disturbance that is recognized in the shortest time by the higher protocol levels in the communication terminal equipment KE respectively having a communication relationship which leads to a cleardown or to an abort of the call. Multiple repetition of statistically disturbed digital information blocks or cells Z and, thus, an additional traffic load on the communication systems KS is thereby avoided. As a result no overload situation of the communication system KS occurs given cells to be switched free of cell losses.

When the switching-oriented resources VR for the respective call are reported in the routing table LT by the entry of the scope of resources information ri but have not yet been used, this being indicated by the lacking entry of the resources use information rvi, then the logged-on, switching-oriented resources vr can still be allocated for the communication of cells Z that are to be communicated free of cell losses or to be communicated not free of cell losses, assuming that no resources availability information rvi is entered in the routing table LT. This means that the first of the furthest cells Z of the call for which the switching-oriented resources vr were reported are completely discarded. As a result the respective call is cleared down by the communication terminal equipment KE. Cells Z to be communicated free of cell losses can thus be communicated free of cell losses using the method of the present invention or can be completely discarded. The logged on switching-oriented resources VR can be allocated for the switching of incoming cells Z of another connection until the arrival of the first cell Z to be switched free of cell losses. The first incoming cell Z to be communicated without cell losses and the further cells Z to be communicated without cell losses are completely discarded.

Figure 4B:
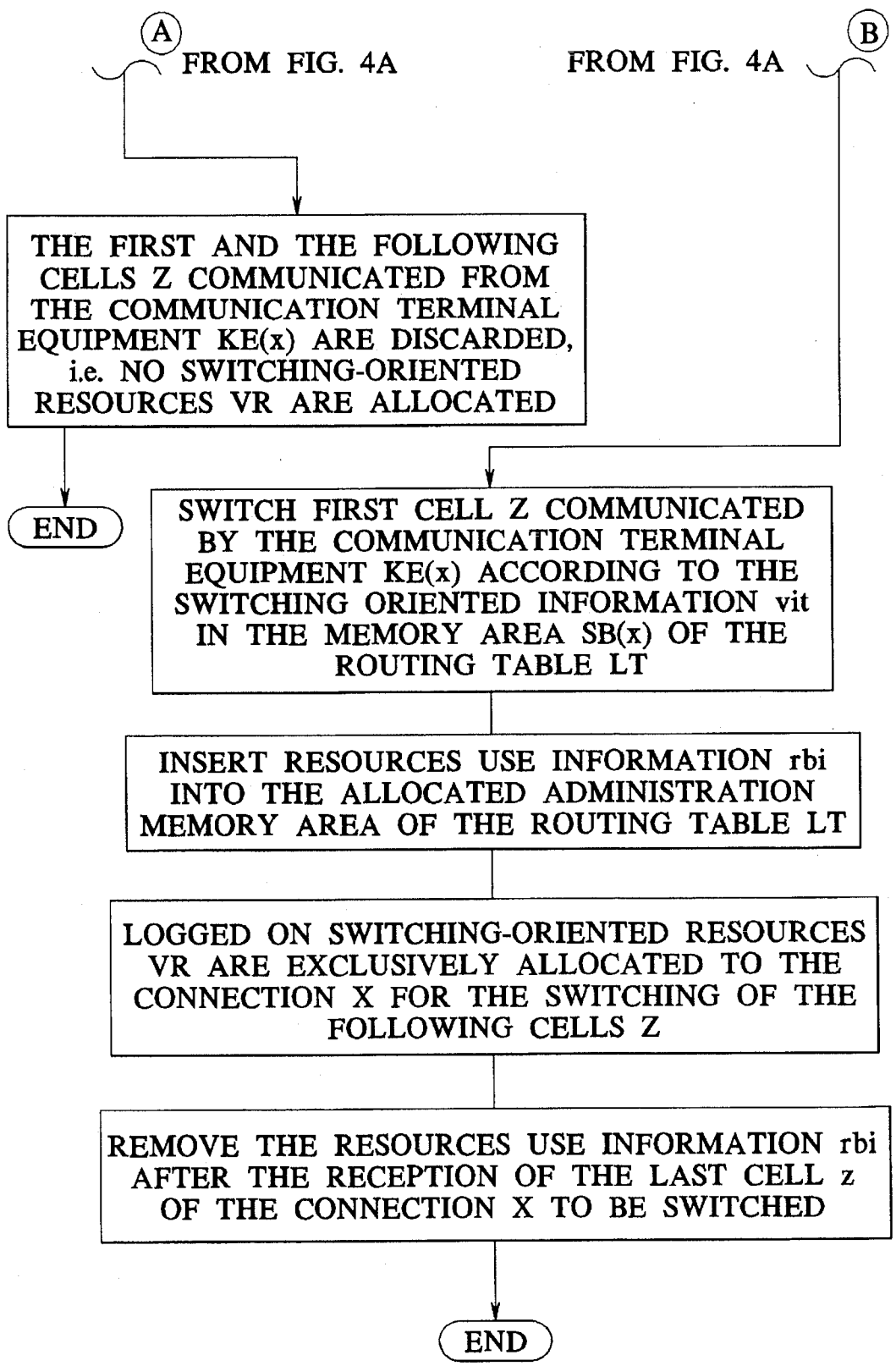
FIG. 4 is a flowchart of an allocation routine implemented in a communication system.

FIG. 4 shows a self-explanatory flowchart of a possible program-oriented realization of the method of the present invention. The allocation routine ZR is to be implemented in every communication system in addition to the known, statistical method for the communication of cells.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for allocation of switching-oriented resources in a communication system operating in asynchronous transfer mode and having communication terminal equipment connected thereto, comprising the steps of:

providing at least a number of switching-oriented resources;

logging-on the number of switching-oriented resources provided for communication of digital information by a communication terminal equipment whose digital information packeted in cells is to be communicated via the communication system without cell losses, said number of switching-oriented resources being logged-on within a framework of a call signaling, up to reception of a first cell, by logon information and by number of resources information;

providing two resource administration areas in routing tables of the communication system with whose assistance switching-oriented routing information, the logon information and the number of resources information are respectively entered in call-associated fashion, resources availability information and resources use information being one of entered and not entered into said two resource administration areas with the assistance of the communication system, said resources availability information indicating the availability of logged on number of resources in the communication system dependent on the traffic load; and given reception of a first cell to be communicated free of cell losses in the communication system, discarding the first cell and all further cells dependent on insertion of resources availability information to thereby cause only a short chronological delay or switching cells loss-free with the assistance of the logged on number of switching-oriented resources, and, given a switching of the cells, entering resources use information into an allocated resources administration area, as a consequence whereof the logged on number of resources is exclusively allocated to the respective call for the communication of the cells to be communicated free of cell losses.

2. The method according to claim 1, wherein the method further comprises: indicating release of the allocated number of resources at a reception of a last cell to be communicated free of cell losses by removal of the resources use information.

3. The method according to claim 1, wherein the method further comprises: allocating the logged on number of resources for switching of incoming cells to be communicated in a further call until reception of the first cell to be communicated free of cell losses; and, given an allocation, completely discarding the incoming first and further cells to be communicated free of losses.

4. The method according to claim 1, wherein the number of resources information is represented by bit rate information indicating a communication rate.

5. The method according to claim 1, wherein the resources administration areas are realized by a memory area respectively representing one bit; and wherein the logon information, the resources availability information and the resources use information are represented by binary information covering one bit.

6. The method according to claim 1, wherein the method for allocating switching-oriented resources is realized by a program-controlled allocation routine and is superimposable on a statistical allocation method.

7. A method for allocation of switching-oriented resources in a communication system operating in asynchronous transfer mode and having communication terminal equipment connected thereto, comprising the steps of:

providing at least a number of switching-oriented resources;

logging-on the number of switching-oriented resources provided for communication of digital information by a communication terminal equipment whose digital information packeted in cells is to be communicated via the communication system without cell losses, said number of switching-oriented resources being reported within a framework of a call signaling by, up to reception of a first cell, logon information and by number of resources information;

providing two resource administration areas in routing tables of the communication system with whose assistance switching-oriented routing information, the logon information and the number of resources information are respectively entered in call-associated fashion, resources availability information and resources use information being one of entered and not entered into said two resource administration areas with the assistance of the communication system, said resources availability information indicating the availability of logged on number of resources in the communication system dependent on the traffic load;

given reception of a first cell to be communicated free of cell losses in the communication system, discarding the first cell and all further cells dependent on insertion of resources availability information to thereby cause only a short chronological delay or switching cells loss-free with the assistance of the logged on number of switching-oriented resources, and, given a switching of the cells, entering resources use information into an allocated resources administration area, as a consequence whereof the logged on number of resources is exclusively allocated to the respective call for the communication of the cells to be communicated free of cell losses; and indicating release of the allocated number of resources upon reception of a last cell to be communicated free of cell losses by removal of the resources use information.

8. The method according to claim 7, wherein the method further comprises: allocating the logged on number of resources for switching of incoming cells to be communicated in a further call until reception of the first cell to be communicated free of cell losses; and, given an allocation, completely discarding the incoming first and further cells to be communicated free of losses.

9. The method according to claim 7, wherein the number of resources information is represented by bit rate information indicating a communication rate.

10. The method according to claim 7, wherein the resources administration areas are realized by a memory area respectively representing one bit; and wherein the logon information, the resources availability information and the resources use information are represented by binary information covering one bit.

11. The method according to claim 7, wherein the method for allocating switching-oriented resources is realized by a program-controlled allocation routine and is superimposable on a statistical allocation method.

12. A method for allocation of switching-oriented resources in a communication system operating in asynchronous transfer mode and having communication terminal equipment connected thereto, comprising the steps of:

providing at least a number of switching-oriented resources;

logging-on the number of switching-oriented resources provided for communication of digital information by a communication terminal equipment whose digital information packeted in cells is to be communicated via the communication system without cell losses, said number of switching-oriented resources being reported within a framework of a call signaling, up to reception of a first cell, by logon information and by number of resources information;

providing two resource administration areas in routing tables of the communication system with whose assistance switching-oriented routing information, the logon information and the number of resources information are respectively entered in call-associated fashion, resources availability information and resources use information being one of entered and not entered into said two resource administration areas with the assistance of the communication system, said resources availability information indicating the availability of logged on number of resources in the communication system dependent on the traffic load;

given reception of a first cell to be communicated free of cell losses in the communication system, discarding the first cell and all further cells dependent on insertion of resources availability information to thereby cause only a short chronological delay or switching cells loss-free with the assistance of the logged on number of switching-oriented resources, and, given a switching of the cells, entering resources use information into an allocated resources administration area, as a consequence whereof the logged on number of resources is exclusively allocated to the respective call for the communication of the cells to be communicated free of cell losses;

indicating release of the allocated number of resources upon reception of a last cell to be communicated free of cell losses by removal of the resources use information; and allocating the logged on number of resources for switching of incoming cells to be communicated in a further call until reception of the first cell to be communicated free of cell losses, and completely discarding the incoming first and further cells to be communicated free of losses.

13. The method according to claim 12, wherein the number of resources information is represented by bit rate information indicating a communication rate.

14. The method according to claim 12, wherein the resources administration areas are realized by a memory area respectively representing one bit; and wherein the logon information, the resources availability information and the resources use information are represented by binary information covering one bit.

15. The method according to claim 12, wherein the method for allocating switching-oriented resources is realized by a program-controlled allocation routine and is superimposable on a statistical allocation method.

* * * * *